US010299347B2

(12) United States Patent
Alfier et al.

(10) Patent No.: US 10,299,347 B2
(45) Date of Patent: May 21, 2019

(54) METHOD OF CONTROLLING LIGHTING SOURCES, CORRESPONDING SYSTEM AND COMPUTER PROGRAM PRODUCT

(71) Applicants: OSRAM GmbH, Munich (DE); CLAY PAKY S.p.A., Seriate (IT)

(72) Inventors: Alberto Alfier, Vedelago (IT); Simone Capeleto, Padua (IT); Giovanni Zucchinali, Seriate (IT); Norbert Haas, Langenau (DE)

(73) Assignees: OSRAM GMBH, Munich (DE); CLAY PAKY S.P.A., Seriate (IT)

( * ) Notice: Subject to any disclaimer, the term of this patent is extended or adjusted under 35 U.S.C. 154(b) by 6 days.

(21) Appl. No.: 15/684,995

(22) Filed: Aug. 24, 2017

(65) Prior Publication Data
US 2018/0063924 A1    Mar. 1, 2018

(30) Foreign Application Priority Data

Aug. 24, 2016 (IT) ................................ 10201686875

(51) Int. Cl.
  *G06T 19/00* (2011.01)
  *H05B 33/08* (2006.01)
  *H05B 37/02* (2006.01)
(52) U.S. Cl.
  CPC ....... *H05B 37/0227* (2013.01); *G06T 19/006* (2013.01); *H05B 33/0845* (2013.01);
  (Continued)
(58) Field of Classification Search
  None
  See application file for complete search history.

(56) References Cited

U.S. PATENT DOCUMENTS

| 6,675,148 B2 * | 1/2004 | Hardwick ........... G10L 19/0204 704/500 |
| 8,878,991 B2 * | 11/2014 | Cook .................. H05B 37/029 348/460 |

(Continued)

FOREIGN PATENT DOCUMENTS

EP    2851894 A1    3/2015

OTHER PUBLICATIONS

Italian Search Report based on application No. 201600086875 (7 pages) dated May 17, 217 (Reference Purpose Only).

*Primary Examiner* — Dion Ferguson
*Assistant Examiner* — Srinivas Sathiraju
(74) *Attorney, Agent, or Firm* — Viering, Jentschura & Partner MBB

(57) ABSTRACT

According to the present disclosure, lighting sources having operating parameter(s) which is controllable in lighting sequence(s) as a function of a time code data set coupled with the sequence, are controlled in cooperation with virtual/augmented reality device(s), by: providing a repository of operating data files for the sources, coupled with the lighting sources, with each data file including time code data set(s) for lighting sequence(s) for a source among the lighting sources, retrieving in the data repository operating data file(s) coupled with a selected one of the lighting sources, and detecting a virtual/augmented reality signal from the virtual/augmented reality device(s), indicative of the fact that the virtual/augmented reality device is gazing at and/or is recognizing the selected lighting source, and operating the selected lighting source by controlling the operating parameter(s) as a function of the operating data included in the operating data file retrieved and of the virtual/augmented reality signal.

15 Claims, 1 Drawing Sheet

(52) U.S. Cl.
CPC ....... *H05B 37/029* (2013.01); *H05B 37/0245* (2013.01); *H05B 37/0272* (2013.01)

(56) References Cited

U.S. PATENT DOCUMENTS

| | | | | |
|---|---|---|---|---|
| 9,094,615 | B2* | 7/2015 | Aman | G01S 3/7864 |
| 9,253,527 | B2* | 2/2016 | Hall | H04N 21/4316 |
| 9,286,726 | B2* | 3/2016 | Balram | G06F 3/011 |
| 9,311,753 | B2* | 4/2016 | Wilkinson | H04N 5/272 |
| 9,432,612 | B2* | 8/2016 | Bruhn | H04N 7/106 |
| 9,436,076 | B2* | 9/2016 | Kim | E04H 3/22 |
| 9,555,310 | B2* | 1/2017 | Aman | A63B 71/0669 |
| 9,560,307 | B2* | 1/2017 | Rivera | G03B 21/00 |
| 9,600,936 | B2* | 3/2017 | Boivin | H04N 5/272 |
| 9,805,272 | B1* | 10/2017 | Chen | G06K 9/00751 |
| 9,888,337 | B1* | 2/2018 | Zalewski | H04W 4/70 |
| 2011/0175925 | A1* | 7/2011 | Kane | G01J 1/42 |
| | | | | 345/589 |
| 2015/0297949 | A1* | 10/2015 | Aman | G06T 7/246 |
| | | | | 348/157 |
| 2016/0091877 | A1 | 3/2016 | Fullam et al. | |
| 2018/0063923 | A1* | 3/2018 | Alfier | H05B 37/0281 |
| 2018/0063926 | A1* | 3/2018 | Alfier | H05B 37/0245 |

* cited by examiner

METHOD OF CONTROLLING LIGHTING SOURCES, CORRESPONDING SYSTEM AND COMPUTER PROGRAM PRODUCT

CROSS-REFERENCE TO RELATED APPLICATION

This application claims priority to Italian Patent Application Serial No. 102016000086875, which was filed Aug. 24, 2016, and is incorporated herein by reference in its entirety.

TECHNICAL FIELD

The present description relates to lighting sources.

One or more embodiments may find application in various contexts, both on a professional and on a non-professional level.

BACKGROUND

Light fixtures for professional applications (e.g. in the show business, such as theatres, cinemas, stages or discotheques) and for semi-professional applications (e.g. hotels, restaurants, meeting rooms), as well as for some non-professional environments (e.g. household or small meeting places) may impose specific needs which are not found in more common situations. In such contexts, it may be desirable to fully take advantage of the potentialities of the lighting sources in ways different from current applications. For example, it may be desirable to modify the lighting features during a show, by acting on parameters such as light colour, light directionality, light distribution, light brightness etc. Such an ability to modify lighting parameters may be of interest also for household applications, e.g. listening to music, watching a TV program or film, for web applications and e.g. for on-line videogames.

In current applications, when it is impossible or undesirable to resort to a wholly human control, audio sensors may be employed which are adapted to detect some characteristics of an audio program being broadcast (e.g. by sensing the bass sounds of drums), by associating such detection to specific interventions on the lighting sources. This solution suffers from intrinsic limitations, both as regards the possible light combinations and as regards a possible creative/artistic usage of the lighting sources: an example may be the possibility of matching lighting in a given environment with a specific musical program/film/event and the flexible usage of lighting sources by the end user.

SUMMARY

One or more embodiments aim at overcoming the previously described drawbacks.

According to one or more embodiments, said object may be achieved thanks to a method having the features specifically set forth in the claims that follow.

One or more embodiments may also concern a corresponding system, as well as a corresponding computer program product adapted to be loaded in the memory of at least one processing device, and including software code portions to execute the processing steps when the program is run on at least one computer. As used herein, the reference to such a computer program product corresponds to the reference to computer-readable media, which contain instructions to control the processing system in order to coordinate the implementation of the method according to the present invention. The reference to "at least one processing device" highlights the possibility of implementing one or more embodiments in a modular and/or distributed arrangement.

The claims are an integral part of the technical teaching provided herein with reference to the embodiments.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

Figure 1:
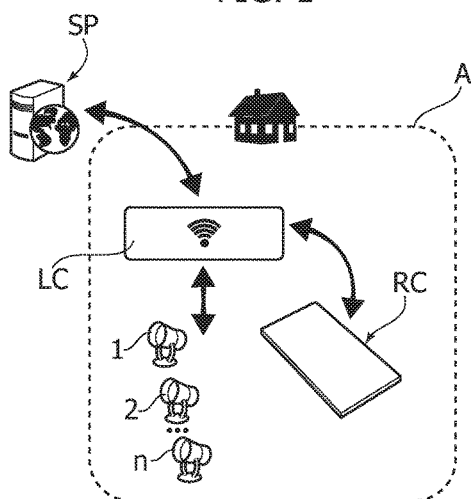
FIG. 1 is a first possible functional block diagram of a system according to one or more embodiments.

In the following description, various specific details are given to provide a thorough understanding of various exemplary embodiments. The embodiments may be practiced without one or several specific details, or with other methods, components, materials, etc. In other instances, well-known structures, materials, and operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only, and therefore do not interpret the extent of protection or scope of the embodiments.

Part of the following detailed description reproduces the detailed description of the Italian Patent Application 102016000024679 of 9 Mar. 2016.

In the Figures, references 1, 2, . . . , n denote a certain number of lighting fixtures, which may be the same or different from each other, and which may be installed in one or more environments, such as a general ambient A.

As used herein, the term "ambient" is to be construed in its broadest meaning, being adapted to include either a venue for shows and/or events (e.g. a theatre, a cinema, a stage, a discotheque, a sport facility etc.) or a public space (e.g. a hotel, a restaurant, a meeting room), or a home environment adapted to be lighted by sources 1, 2, . . . , n, which may be present in any number.

In one or more embodiments, the light radiation sources may be implemented with different technologies.

Moreover, it will be assumed herein that said lighting sources have at least one selectively controllable operating parameter.

Said operating parameter may be chosen in a very wide range: it may be e.g. the level of light brightness (which is controllable in on/off switching but also for a selective adjustment of intensity, so-called "dimming"), or the colour of the emitted light radiation, the orientation (both static, so-called "tilt", or dynamic, e.g. as regards the speed, the width or the path of a panoramic movement), the focus, the zoom (panoramic or spotlight) and so on: as a possible non-limiting reference, it is possible to take into account all the parameters which may be modified in order to implement lighting effects, optionally in combination with other effects (e.g. coloured smoke).

Light radiation sources having such option of selectively controlling at least one lighting parameter are known in the art, which makes it unnecessary to provide a more detailed description herein.

This also regards the possibility of controlling such parameters according to one or more lighting sequence, according to a time code data set adapted to identify, e.g., when a certain parameter of the light radiation source is to be modified. As a simple example (the idea being adapted to be transferred to any parameter regulating the operation of a lighting source) we may mention an on/off switching sequence of the source at given times, which identify the moments when the light radiation source is turned on or off.

Therefore, for each light radiation source $1, 2, \ldots, n$, it is possible to identify at least one operating parameter which may be controlled according to at least one lighting sequence, on the basis of a certain time code data set. Such control action may be exerted via a control device—known in itself—which will be named local controller LC in the following. The term "local" refers to the fact that such a controller may act locally (i.e. in ambient A), in order to control the light radiation sources $1, 2, \ldots, n$ correspondingly.

This may take place specifically via a computer program product (i.e. via software) offering the ability, via controller LC, to identify each single source $1, 2, \ldots, n$ and to act on the respective operating parameters, according to software instructions adapted to be defined by the user during calibration.

For example, in one or more embodiments, the user may calibrate certain functions, e.g. according to the installation of the devices in ambient A.

In one or more embodiments, such a calibration (i.e. a preparatory definition of the parameters which may be controlled, and of the way they may be controlled, for each source $1, 2, \ldots, n$) may also be carried out by the end user, via a remote controller RC which will be better detailed in the following.

In one or more embodiments, the software instructions may not be exactly defined at the beginning, the "free parameters" (undefined parameters) thereof being adapted to be set during calibration.

One or more embodiments may envisage providing, e.g. at a server SP (adapted to be located remotely from ambient A, although such a solution is not mandatory), a repository of operating data of sources $1, 2, \ldots, n$.

In one or more embodiments, the files of such operating data may be organized in Data Packages (DPs) which are coupled, i.e. associated, to lighting sources $1, 2, \ldots, n$, in such a way that each data file DP may comprise at least one time code data set for at least one lighting sequence of a respective lighting source $1, 2, \ldots, n$.

The following Table exemplifies a possible organization of such Data Packages:

| Source No. | Lighting Sequence | Time Code Data Set |
|---|---|---|
| 1 | S11 | $t_{S11,1}, t_{S11,2}, \ldots, t_{S11,k}$ |
| 1 | S12 | $t_{S12,1}, t_{S12,2}, \ldots, t_{S12,1}$ |
| 2 | S21 | $t_{S21,1}, t_{S21,2}, \ldots, t_{S21,w}$ |
| 3 | S31 | $t_{S31,1}, t_{S31,2}, \ldots, t_{S31,u}$ |
| 3 | S32 | $t_{S32,1}, t_{S32,2}, \ldots, t_{S32,z}$ |
| 3 | S33 | $t_{S33,1}, t_{S33,2}, \ldots, t_{S33,m}$ |
| 3 | S34 | $t_{S34,1}, t_{S34,2}, \ldots, t_{S34,n}$ |
| ... | ... | ... |
| N | Sn1 | $t_{Sn1,1}, t_{Sn1,2}, \ldots, t_{Sn1,v}$ |

In this table, Sij denotes the j-th sequence available for the i-th source, with the association of a respective time code data set $t_{Sij,1}, t_{Sij,2}, \ldots$ As a deliberately simplified example, each sequence may be considered as simply identifying a sequence of on/off switching which must take place at the identified times of the related time code data $t_{Sij,1}, t_{Sij,2}, \ldots$ In one or more embodiments, as exemplified in the Figures, server SP may be located remotely from ambient A, and may be configured to communicate remotely with controller LC, with the ability of exchanging said Data Packages along a connection, e.g. a web connection such as the Internet.

Figure 2:
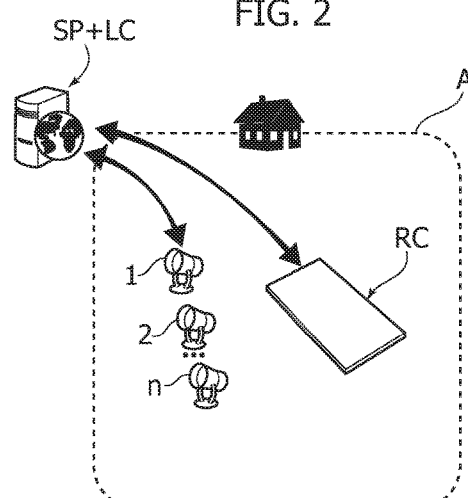
FIG. 2 is a second possible functional block diagram of a system according to one or more embodiments.
Figure 3:
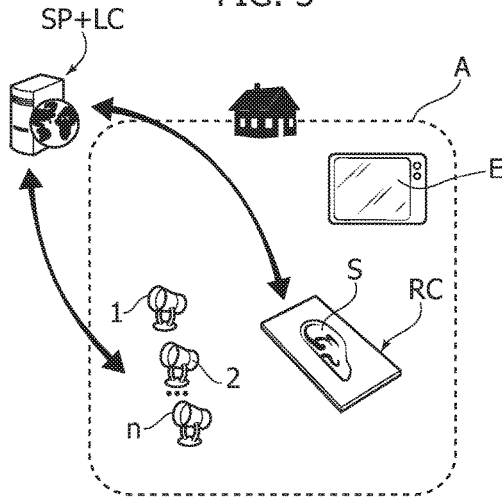
FIG. 3 is a third possible functional block diagram of a system according to one or more embodiments.

In one or more embodiments as exemplified in FIGS. 2 and 3, controller LC may be practically embedded in server SP, while keeping the role of "local" controller as defined in the foregoing.

Moreover, the ability is preserved to interact with sources $1, 2, \ldots, n$, so as to control the operating parameters thereof and/or to interact with remote controller RC, which may host the calibration software mentioned in the foregoing.

As regards the connection and the interaction between server SP, local controller LC and remote controller RC, different solutions may be resorted to as exemplified in the Figures.

Figure 4:
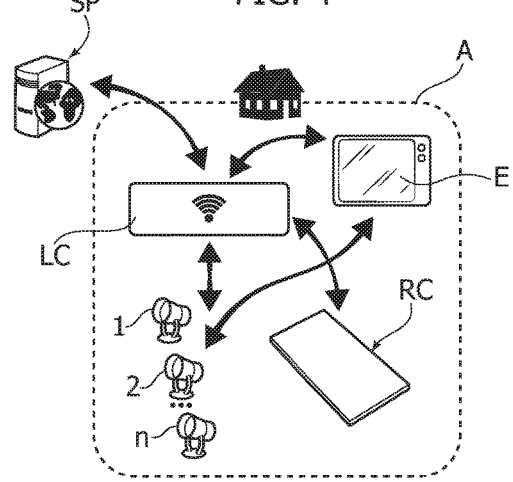
FIG. 4 is a fourth possible functional block diagram of a system according to one or more embodiments.

For example, FIGS. 1 and 4 refer to possible solutions wherein controller LC performs the role of a node, to which server SP, remote controller RC and sources $1, 2, \ldots, n$ are connected.

On the other hand, FIGS. 2 and 3 exemplify solutions wherein, as controller LC is embedded in server SP, the assembly including server SP and controller LC is connected both with remote controller RC and with sources $1, 2, \ldots, n$.

As regards the specific implementations, the connections may be either wired or wireless, comprising either standard or specific data transmission protocols.

In one or more embodiments, controller LC and remote controller RC may be embedded in one device such as a smartphone, a smart TV set, specific devices such as a Set Top Box, or in a computer.

Moreover, in one or more embodiments the physical interaction with server SP may be limited to one of controller LC or remote controller RC; in this case, the component which is not connected to server SP (e.g. controller LC, or respectively remote controller RC) uses the connected device (i.e. remote controller RC or, respectively, controller LC) for transferring data towards server SP.

In embodiments as exemplified in FIGS. 2 and 3, lighting sources $1, 2, \ldots, n$ may be connected directly to server SP, the functions of controller LC being practically embedded in server SP.

In such a case, remote controller RC may connect directly to server SP, e.g. via standard functions similar to those used on a smartphone or a tablet.

In one or more embodiments, local controller LC implements the communication of server SP with the fixtures 1, 2, . . . , n and with remote controller RC.

In one or more embodiments, as exemplified in FIGS. 2 and 3, the fixtures and the remote controller may be connected directly to the SP, without the need of a local controller LC as a separate entity. One example is a remote controller RC implemented as a smartphone, the sources comprising an IP address and a router.

In this case, the function of controller LC is practically "embedded", i.e. it is performed by such other entities.

It will be understood, therefore, that the reference to three separate entities, i.e. local controller LC, server SP and remote control RC is here merely functional and does not assume, even implicitly, the provision of such components as physically separated entities.

For example, in one or more embodiments as exemplified in FIGS. 2 and 3, the function of local controller LC which in FIGS. 1 and 4 is shown as performed by a discrete entity may be carried out directly by server SP.

Moreover, in one or more embodiments, the function of the local controller LC may serve to control a certain source or fixture 1, 2, . . . , n by forwarding a lighting sequence to such fixture once it has been obtained by the SP.

In one or more embodiments, server SP may contain a data repository (i.e. a database) comprising data files or Data Packages which may be selected e.g. by the end user via remote controller RC.

As described in the foregoing, in one or more embodiments each Data Package may include (at least):
  one or more lighting sequences compatible with sources 1, 2, . . . , n installed in ambient A, and
  one or more time code data sets associated, in server SP, to the lighting sequences.

In one or more embodiments (by acting e.g. on remote controller RC) the user may therefore select a given lighting sequence for a given source 1, 2, . . . , n, thus originating the retrieval, within the repository of server SP, of at least one Data Package coupled to the selected lighting source.

The thus identified Data Package may therefore be used to control the light radiation sources 1, 2, . . . , n according to the selected Data Package, i.e. by operating (each) selected light radiation source through the selective control of at least one operating parameter thereof, according to the operating data contained in the operating data file (Data Package) retrieved from the repository.

A system as exemplified herein may be used according to a wide range of possibilities.

For example, while he is following a given audio/video event (e.g. while he is watching a TV show or a film, while he is listening to a concert, etc.), the user may establish (e.g. via remote controller RC) a connection to server SP, and select one or more given lighting sequences which he wants to apply onto lighting sources 1, 2, . . . , n located in ambient A where he is at the moment.

Such a selection may be achieved, e.g., in the repository present in server SP, from a list of events which has previously been stored in server SP.

At this point, a lighting sequence which has been selected for a given source (more precisely, the Data Package associated thereto) may be used to operate that source according to that sequence, specifically as regards the time code data set.

In one or more embodiments, the related time code data set may enable synchronising the lighting sequence with the audio/video event on the basis of the user's request.

It will be appreciated that what has been said in the foregoing with reference to one source may be applied, even simultaneously, to two or more sources 1, 2, . . . , n.

For this purpose, one or more embodiments may take advantage of the fact that the configuration parameters of sources 1, 2, . . . , n may be standardized, being e.g. based on the same definition of parameters, thus enabling e.g. the definition of a standardized language linked to the operating parameters of the light radiation sources of a given manufacturer (who may know or own the control configuration).

For example, in one or more embodiments, the Data Packages collected in the repository of server SP may correspond to lighting sequences associated to specific events (e.g. given films, songs, shows), created and stored in the repository by:
  either professional or amateur lighting directors,
  producers of music/video software,
  event organizers,
  producers, developers and distributors of the lighting sources.

In one or more embodiments, said Data Packages may be generated by the end user and then may be loaded into server SP by taking advantage of the existing connection with remote controller RC (optionally through controller LC), so as to confer the end user the role of an amateur lighting director.

In this regard, in one or more embodiments, a given lighting sequence may be stored in the sources 1, 2, . . . , n, e.g. as a pre-programmed function according to a basic operation.

As previously stated, the synchronization (phasing) of the lighting sequences of the repository of server SP may be achieved through the time code data sets associated to such sequences, which are implemented e.g. via a standard communication language which may be used by a broadcast source (web radio, web tv, web music).

In one or more embodiments, such a synchronising mechanism may involve the intervention of adaptive mechanisms.

Such mechanisms may be either open-loop or closed-loop mechanisms.

The first option may comprise, e.g., an (accurate) estimate and compensation of the possible delays between the audio/video program and the signals regulating the application of the lighting sequence, which may optionally be improved e.g. by "ping" tests.

In the second instance it is possible to use, as a loop control signal, an ambient audio/video signal which corresponds to the broadcast program, e.g. via a TV set or monitor E or a similar device installed in ambient A (see FIGS. 3 and 4).

Such an "ambient" signal may be obtained via sensors (e.g. via an audio/video sensor S such a microphone associated with remote controller RC—which, as previously stated, may also be implemented via a smartphone, see FIG. 3) or via a direct connection e.g. to said device E (see FIG. 4).

However it may be obtained, said "ambient" audio and/or video signal may be used either directly or after further processing; the latter may be adapted to be performed, totally or partially, at a remote location, e.g. at server SP, with the consequent possibility of using even rather powerful software tools.

In one or more embodiments, the availability of such information on the audio and/or video program broadcast in ambient A may be used in order to drive the retrieval of the lighting sequence to be performed by sources 1, 2, . . . , n.

This may be the case e.g. if, for a given audio and/or video program, the repository of server SP offers several different lighting sequences.

In this case, in addition or in alternative to the selection by the final user (which can be expressed e.g. via remote controller RC), in one or more embodiments there may be present an automatic selection implemented in server SP, optionally on the basis of the previously collected information about e.g. the habits or the preferences of the end user.

In one or more embodiments (highlighting again the merely functional purpose of the distinction operated herein of controller LC, server SP and remote controller RC), both controller LC and remote controller RC may be used, at least partially, to store the repository of the Data Packages, e.g. if the connection to server SP is not available at the moment.

In one or more embodiments, a user input data set (e.g. parameters defined by the user such as e.g. the data concerning a certain media event, the names of given events, programming codes of live or recorded TV shows or sport events, or film titles, music titles, contents of playlists offered e.g. by an external service provider) may be loaded, optionally directly, into server SP while being associated with the Data Packages stored therein. Server SP, therefore, is adapted to determine lighting sequences e.g. on the basis of a further set of user input data (i.e. a specific lighting arrangement) so as to receive "tagged" Data Packages (both time-tagged and event-tagged) from server SP, which may control and operate in due time e.g. a set of lighting components (i.e. lighting sources 1, 2, . . . , n).

In one or more embodiments, the operating parameter(s) of lighting sources 1, 2, . . . , n may comprise e.g. brightness and colours, the consequent possibility being given of adjusting the lighting colour and brightness e.g. to take into account possible preferences or needs of the end user, e.g. to take into account the mesopic/scotopic sensitivity of the human eyes (and the differences in children and adults), the additional possibility being given of considering daltonism and sight disturbances of various nature.

As regards so-called "special effects", the controllable operating parameters may comprise parameters for underwater lighting effects or for light fountain effects, e.g. the possibility being given of regulating different colour shades to take into account and/or reproduce the absorbing effect of water.

As for the geometric parameters (such as the orientation of the light sources), optionally in combination with the selective control of parameters such as brightness, it is possible to take into account for example geometric factors (e.g. height or size) of ambient A.

It will be appreciated, moreover, that in one or more embodiments the functional connection towards light radiation sources 1, 2, . . . , n does not necessarily require a physical connection, as it may be implemented as wireless, DMX or other methods.

As previously stated, programming codes (optionally encrypted) may be stored in sources 1, 2, . . . , n, in such a way as to enable a selective control by entitled users.

A further possibility consists in using software code (e.g. an application or "App" for mobile phone, or TV, or web) on the local controller LC for selecting music (audio data, optionally associated with video data) from a distributor acting as a source, the data sequence being received together with the lighting sequence. The application may synchronize the data sets by sending them, e.g. via a local area network (LAN) (multicast and/or broadcast, for example) to connected devices, such as a TV set, an audio system, and the group of lighting sources 1, 2, . . . , n. A partial/total buffer may compensate for the delay and/or the slowness of the network.

One or more embodiments may adopt particular modes of encoding/decoding the data set of the lighting sequences.

For example, the data set may be encoded and loaded into server SP after or while programming a sequence, or at least at the end thereof.

For example, again, a data set coupled with a given selected lighting sequence may be decoded by the end user through a decoding algorithm, which may be:
  either embedded in the lighting source(s),
  or embedded in one or more additional hardware devices, outside the sources, which decode the sequences and send them to the sources.

In one or more embodiments, the sources may be addressed individually by the decoder, either directly or by having the decoder address a source acting as a master, which subsequently transfers the sequence(s) to the other sources, acting as slaves.

It will be appreciated that various aspects of the solution may be transferred from one to another of the examples shown in FIGS. 1 to 4.

For example, in an arrangement as exemplified in FIG. 1, local controller LC may include a simple mobile phone with a given application (APP) installed therein.

In one or more embodiments, in order to achieve a protection against various intrusions (e.g. from competitors), the lighting sequences may be encoded with a protective encryption in server SP, a hardware decoder may be used (optionally a physical device embedded in a master source, which subsequently transfers the related information to the slave sources).

One or more embodiments may therefore envisage:
  coupling respective audio and/or video data to the data files (Data Packages), and/or
  applying protective encoding to said data files, and/or
  coupling said data files to respective audio and/or video data, by applying protective coding to said files and to the respective audio and/or video data associated thereto.

In the case of videogames, the entitlement to creating the lighting sequences may be restricted to the game designers only, by enabling e.g. the calibration of the lighting arrangement via console, the sequences being stored in a repository at a server of the videogame publisher.

One or more embodiments, as described in the foregoing, may envisage the so-called streaming of pre-programmed stored data (from a data repository) together with media files (audio, video), and inputting it into a controller that operates/controls auxiliary lighting fixtures, so as to generate lighting effects which enhance the experience of the viewer/customer.

The lighting fixtures may employ e.g. LED sources, which may be arranged according to RGB or RGBW patterns, and/or a combination of various sources (halogen lamps, discharge lamps, LEDs, laser diodes, Laser Activated Remote Phosphor—LARP, etc.)

One or more embodiments as previously described may envisage the following operation:
  i) the lighting designer programs lighting sequences for effect lighting luminaries, which are adapted to enhance the video/audio content consumed by the user, such as movies, various shows, music, computer games etc. This may take place according to lighting programs which are recognized as standard in the lighting industry (e.g. effect lighting for shows, musical performances, etc.);

the lighting programs are stored into a data repository, e.g. at media providers and/or media distributors;

if the users want e.g. to stream music, from sources such as e.g. Spotify™ or Tidal™, and/or watch movies from sources such as e.g. Netflix™, they may also receive the pre-programmed fixture lighting sequences streamed, with the possibility of applying them (e.g. by means of their home WLAN, Wi-Fi, Bluetooth™) to a specific lighting fixture. The pre-programmed lighting sequences are time encoded, and may be synchronized with the audio/video content (e.g. video/music) and cooperate with the external lighting fixtures.

One ore more embodiments may find application in contexts wherein e.g. viewer E is a device (equipment) for Virtual Reality (VR) or Augmented Reality (AR), such as e.g. a headset or goggles.

For the sake of brevity, said virtual reality/augmented reality (VR/AR) equipment/device may simply be denoted as "virtual reality device", taking into account the fact that an augmented reality equipment may combine a function of virtual or synthetic reality with the ability of viewing the surrounding environment (e.g. through a semi-transparent screen, and/or by distributing the vision of synthetic images and of real images to both eyes of the user: the phrase "Virtual Reality" (VR) may therefore be considered as also including the phrase "Augmented Reality" (AR).

One or more embodiments may concern the possible interaction of a system as described in the foregoing with a virtual/augmented reality device (equipment).

One or more embodiments propose implementing a possible synchronized operation of internal and external lighting effects within a context of virtual reality, e.g. by using virtual reality devices that are distributed to the users together with media files and/or files generated by a virtual reality software (e.g. for recognising an object and/or for recognising the current viewing of an object).

In devices such as virtual reality headsets or goggles, as a rule no directly visible (real) information is transferred to the viewer's eyes. This means that the viewer's eyes are practically separated from the surrounding environment.

This is substantially true also for equipment such as augmented reality headsets or goggles, wherein the user maintains a direct vision of the surrounding environment (e.g. through a semi-transparent screen) or in situations wherein, e.g. as regards goggles, the user maintains a direct vision of the surrounding environment through one eye, while the other eye views "virtual" objects or, more generally, virtual information.

VR/AR equipment are known in the art, e.g. as goggles or headsets which may optionally be provided with tracking mechanisms and audio devices, which may be either audio players or microphones.

In this respect it is possible to refer e.g. to documents such as US 2016/048203 A1.

Referring again to Patent Literature, documents such as U.S. Pat. No. 9,011,247 B2, U.S. Pat. No. 9,220,158 B2 or U.S. Pat. No. 8,878,991 B2 show lighting networks which may be employed e.g. for shows, with video data input and auxiliary lighting effects which may be based on pre-programmed illumination identifiers. However, in this case the lighting program codes are not distributed together with the media content, in order to allow the user to enjoy lighting effects while consuming the distributed media.

The system commercially known as Philips Ambilight addresses the issue of lighting the environment surrounding a TV set on the basis of the media content shown on the same TV set, but these signals are not distributed to the users as a function of specific media content (music, movies, games).

A VR/AR equipment may be used for various purposes, e.g. for (video)games or entertainment programs, offering in addition the possibility of object recognition in the surrounding environment, with an object recognition software which is adapted to provide additional information (e.g. from an information data bank) by overlaying such information with the recognized object.

The function of object recognition may also start an activation program, which changes the status of given objects; for example, if a lighting device (e.g. one of the sources 1, 2, . . . , n in the Figures) is recognized, a command may be generated to switch the lighting source(s) on or off, or to change the lighting conditions.

In addition, e.g. laser eye tracking devices may identify the eye focusing direction, with an associated software which is adapted to extrapolate the user's viewing direction in order to identify the objects being looked at.

If these objects are lighting devices (such as sources 1, 2, . . . , n), including optional associated control devices or switches—such elements being herein considered, for the sake of simplicity, as being part of the lighting source—it is then possible to execute given lighting programs.

If the VR/AR equipment/device (such as e.g. the viewer denoted as E in the Figures) is used for playing games or watching movies, the system configuration and the related operation as previously described may be used to provide synchronized data sets adapted to activate given lighting scenarios in the external lighting system (see for instance sources 1, 2, . . . , n visible in the Figures) or to provide activation commands which cooperate with pre-installed or stored lighting scenarios.

These stored scenarios may reside in a controller, which may optionally be integrated in one or more sources of the external lighting source 1, 2, . . . , as previously described.

One or more embodiments may be used in combination with embodiments described in other patent applications for Industrial Invention, filed on the same date by the same Applicants, e.g. to show lighting effects with an advertising content and/or to provide a function of adaptive adjustment of the overall lighting, e.g. while playing a game.

One or more embodiments may envisage, while consuming a given media content (video, movies, music, games), the activation of the "internal" lighting sources integrated in the VR device (e.g. lighting devices mounted onto the frame or in a peripheral position of the VR device) in sync with the activity being performed.

Such embodiments may make game playing more enjoyable and user-friendly.

In this context, therefore, one or more sources among the lighting sources shown in the diagrams of the Figures with the references 1, 2, . . . , n may be actually considered as integrated with viewer E, which is here considered as an example of virtual reality device.

In one or more embodiments, such a function of "internal" lighting of the virtual reality device may be synchronized with lighting scenarios which are distributed or implemented by means of the lighting sources located in the surrounding environment. In this way, the internal and the external lighting effects may be synchronized.

In the case of the virtual reality device, such synchronized effects may be enjoyed both by the user of the virtual reality device (as "internal" effects) and by other subjects/audience who may be present in the surrounding environment (as "external" effects).

Again, it is to be reminded that, in the present description, the phrase "virtual reality" must be construed as including the phrase "augmented reality"; therefore, what has been stated in the foregoing with reference to a virtual reality device is to be understood as applicable to an augmented reality device, too; this different phrasing is not to be construed as differentiating one device from the other.

In one or more embodiments, the function of "internal" lighting of the virtual reality device E may make use of modified control commands for the internal light radiation sources (i.e. the light sources which are integrated in device E), so as to adjust them e.g. as a function of a desired lighting level (e.g. with a lighting condition which may be generally dark or at least dimmed).

Such sets of modified lighting may be provided e.g. by means of a software associated to the device, while the external light radiation sources keep on receiving the "regular" lighting commands, because their operation does not depend on specific darkness/dimming conditions.

As previously mentioned, in one or more embodiments, the virtual reality device E may be adapted to detect the position and the orientation of the user's head. When such information is available, the position/orientation of the head or the eyes may be synchronized with the location of the external lighting sources, so as to enable, for example, to synchronize the internal lighting effects with the external lighting effects of one or more "external" lighting sources, which are being pointed at by the user, e.g. achieving a synchronizing effect.

In one or more embodiments, when the user of device E is watching e.g. a TV show or a movie shown on a TV screen or on a portable device, such as a smartphone or a tablet (this situation may mainly refer to an augmented reality device, wherein the synthetic information of virtual reality is combined with the vision of the external environment, e.g. by using a semi-transparent screen or by separately sending the direct vision and the vision of virtual images respectively to each eye the user, which may take place e.g. by means of augmented reality goggles), the device, e.g. the goggles, may receive lighting commands via different channels, e.g. via Bluetooth, W-lan or other connections directly from an external device, optionally as data streaming (delivered e.g. via a W-LAN network), so that the lighting programs may be executed on the external devices in sync with the virtual reality device E. In this way, for example, the user may be more intensely involved in the development of a game.

For example, in one or more embodiments, the virtual/augmented reality signal may be connected to a virtual event, such as the appearance of a Pokémon© character.

One or more embodiments may therefore concern a method of controlling lighting sources (e.g. 1, 2, . . . , n) in cooperation with at least one virtual/augmented reality device (e.g. E), said lighting sources having at least one operating parameter which is controllable in at least one lighting sequence as a function of a time code data set coupled with said sequence, the method including:
 providing a repository (e.g. SP) of operating data files for the lighting sources, said operating data files being coupled with said lighting sources, with each data file including at least one time code data set for at least one lighting sequence for a respective one of said lighting sources,
 retrieving in said data repository at least one operating data file coupled with a selected one of said lighting sources, and
 detecting, from said at least one virtual/augmented reality device, at least one virtual/augmented reality signal, indicative of the fact that said virtual/augmented reality device is gazing at and/or is recognizing said selected lighting source,
 operating said selected lighting source by controlling said at least one operating parameter as a function of the operating data included in the operating data file retrieved and said at least one virtual/augmented reality signal.

As previously mentioned, the virtual/augmented reality signal may be connected to a virtual event, such as the appearance of a Pokémon© character.

Moreover, in one or more embodiments, a virtual/augmented reality device may be implemented by using e.g. a split-screen smartphone in combination with a headset or the like, as illustrated e.g. in https://vr.google.com/cardboard/

In one or more embodiments, at least one of said lighting sources may be incorporated into said at least one virtual/augmented reality device.

In one or more embodiments, said at least one virtual/augmented reality device is provided with a display having at least one respective operating parameter controllable with a lighting sequence, and the method may include operating said selected lighting source and said at least one virtual/augmented reality device by controlling said at least one operating parameter and said at least one respective operating parameter as a function of the operating data included in the operating data file retrieved.

In one or more embodiments, said at least one respective operating parameter may include the lighting level of said at least one of said lighting sources, incorporated in said at least one virtual/augmented reality device.

One or more embodiments may include activating/deactivating said selected lighting source as a function of said at least one virtual/augmented reality signal.

One or more embodiments may include operating said selected lighting source by controlling said at least one operating parameter in a synchronized manner with said at least one virtual/augmented reality signal.

One or more embodiments may concern a lighting system, including:
 at least one lighting source having at least one operating parameter which is controllable in at least one lighting sequence as a function of a time code data set coupled with said sequence,
 a repository of operating data files for lighting sources, said operating data files being coupled with a plurality of lighting sources, with each data file including at least one time code data set for at least one lighting sequence for a respective one of said lighting sources,
 at least one virtual/augmented reality device, adapted to generate at least one virtual/augmented reality signal indicative of the fact that said virtual/augmented reality device is gazing at and/or is recognizing a selected lighting source, and
 control means configured for:
 retrieving in said repository at least one operating data file coupled with said selected lighting source, and
 operating said selected lighting source by controlling said at least one operating parameter as a function of the operating data included in the operating data file retrieved and of said at least one virtual/augmented reality signal, the system being configured for operating with the method according to one or more embodiments.

One or more embodiments may concern a computer program product, loadable in the memory of at least one computer and including software code portions for performing the method according to one or more embodiments.

Without prejudice to the basic principles, the implementation details and the embodiments may vary, even appreciably, with respect to what has been described herein by way of non-limiting example only, without departing from the extent of protection.

The extent of protection is defined by the annexed claims.

The invention claimed is:

1. A method of controlling lighting sources in cooperation with at least one augmented reality device, said lighting sources having at least one operating parameter which is controllable in at least one lighting sequence as a function of a time code data set coupled therewith, the method comprising:
providing a repository of operating data files for said lighting sources, said operating data files coupled with said lighting sources with each data file including at least one time code data set for at least one lighting sequence for a respective one of said lighting sources,
retrieving in said repository at least one operating data file coupled with a selected one of said lighting sources,
detecting at least one augmented reality signal from said augmented reality device indicative of said augmented reality device gazing at and/or recognizing said selected one of said lighting sources by detecting a position/orientation of a user's head or eyes and synchronizing the position/orientation with the location of said lighting sources external to the augmented reality device, and
operating said selected one of said lighting sources by controlling said at least one operating parameter as a function of the operating data included in the operating data file retrieved and said at least one augmented reality signal to synchronize the lighting effects of said lighting sources incorporated into the augmented reality device with the lighting effects of the one or more said lighting sources external to the augmented reality device being pointed at by the user.

2. The method of claim 1, wherein at least one of said lighting sources is incorporated to said augmented reality device.

3. The method of claim 2, wherein said at least one respective operating parameter includes a lighting level of said at least one of said lighting sources incorporated to said augmented reality device.

4. The method of claim 1, wherein said at least one augmented reality device is provided with display having at least one operating parameter controllable with a lighting sequence, the method comprising operating said selected one of said lighting sources and said at least one augmented reality device by controlling said at least one operating parameter and said at least one respective operating parameter as a function of the operating data included in the operating data file retrieved.

5. The method of claim 1, further comprising activating/de-activating said selected one of said lighting sources as a function of said at least one augmented reality signal.

6. The method of claim 1, further comprising operating said selected one of said lighting sources by controlling said at least one operating parameter in a synchronized manner with said at least one augmented reality signal.

7. The method of claim 1, wherein said lighting sources comprise a first set of lighting sources external to the augmented reality device and a second set of lighting sources incorporated into the augmented reality device.

8. The method of claim 7, wherein operating said selected one of said lighting sources synchronizes the lighting effects of said lighting sources incorporated into the augmented reality device with the lighting effects of the one or more said lighting sources external to the augmented reality device being pointed at by the user.

9. The method of claim 1, wherein the augmented reality device is configured to receive lighting commands from an external device executing one or more lighting programs in sync with the augmented reality device.

10. A lighting system, comprising:
lighting sources having at least one operating parameter which is controllable in at least one lighting sequence as a function of a time code data set coupled therewith,
a repository of operating data files for lighting sources, said operating data files coupled with a plurality of lighting sources with each data file including at least one time code data set for at least one lighting sequence for a respective one of said lighting sources,
at least one augmented reality device for generating at least one augmented reality signal indicative of said augmented reality device gazing at and/or recognizing said selected one of said lighting sources, and
control means configured for:
retrieving in said repository at least one operating data file coupled with a selected one of said lighting sources,
operating said selected one of said lighting sources by controlling said at least one operating parameter as a function of the operating data included in the operating data file retrieved and said at least one augmented reality signal, the system configured for operating according to a method of controlling lighting sources.

11. The method of claim 10, wherein said lighting sources comprises a first set of lighting sources external to the augmented reality device and a second set of lighting sources incorporated into the augmented reality device.

12. The method of claim 11, wherein operating said selected one of said lighting sources synchronizes the lighting effects of said lighting sources incorporated into the augmented reality device with the lighting effects of the one or more said lighting sources external to the augmented reality device being pointed at by the user.

13. A computer readable non-transitory storage medium including a computer program product, loadable in a memory of at least one computer and comprising software code portions for performing a method of controlling lighting sources in cooperation with at least one augmented reality device, said lighting sources having at least one operating parameter which is controllable in at least one lighting sequence as a function of a time code data set coupled therewith, the method comprising:
providing a repository of operating data files for said sources, said operating data files coupled with said lighting sources with each data file including at least one time code data set for at least one lighting sequence for a respective one of said lighting sources,
retrieving in said data repository at least one operating data file coupled with a selected one of said lighting sources,
detecting at least one augmented reality signal from said augmented reality device indicative of said augmented reality device gazing at and/or recognizing said selected one of said lighting sources, and operating said selected one of said lighting sources by controlling said at least one operating parameter as a function of the operating data included in the operating data file retrieved and said at least one augmented reality signal.

14. The method of claim 13, wherein said lighting sources comprises a first set of lighting sources external to the augmented reality device and a second set of lighting sources incorporated into the augmented reality device.

15. The method of claim 14, wherein operating said selected one of said lighting sources synchronizes the lighting effects of said lighting sources incorporated into the augmented reality device with the lighting effects of the one or more said lighting sources external to the augmented reality device being pointed at by the user.

* * * * *